(12) United States Patent
Jensen et al.

(10) Patent No.: US 8,343,573 B2
(45) Date of Patent: Jan. 1, 2013

(54) METHOD FOR REPAIRING A COMPONENT BY COATING

(75) Inventors: Jens Dahl Jensen, Berlin (DE); Jens Klingemann, Berlin (DE); Ursus Krüger, Berlin (DE); Daniel Körtvelyessy, Berlin (DE); Volkmar Lüthen, Berlin (DE); Ralph Reiche, Berlin (DE); Oliver Stier, Berlin (DE)

(73) Assignee: Siemens Aktiengesellschaft, München (DE)

( * ) Notice: Subject to any disclaimer, the term of this patent is extended or adjusted under 35 U.S.C. 154(b) by 57 days.

(21) Appl. No.: 12/679,389

(22) PCT Filed: Sep. 19, 2008

(86) PCT No.: PCT/EP2008/062510
§ 371 (c)(1),
(2), (4) Date: Jul. 8, 2010

(87) PCT Pub. No.: WO2009/040306
PCT Pub. Date: Apr. 2, 2009

(65) Prior Publication Data
US 2010/0297345 A1 Nov. 25, 2010

(30) Foreign Application Priority Data
Sep. 21, 2007 (DE) .......................... 10 2007 046 386

(51) Int. Cl.
*B05C 13/00* (2006.01)
*C23C 4/08* (2006.01)

(52) U.S. Cl. ........ 427/142; 427/140; 427/453; 427/455; 427/456

(58) Field of Classification Search .................. 427/142, 427/446, 453, 455, 456, 421.1, 427, 140
See application file for complete search history.

(56) References Cited

U.S. PATENT DOCUMENTS

| 5,674,610 | A | 10/1997 | Schaeffer et al. | |
|---|---|---|---|---|
| 6,905,728 | B1 * | 6/2005 | Hu et al. ........................ | 427/142 |
| 2002/0066770 | A1 | 6/2002 | James | |
| 2003/0167636 | A1 * | 9/2003 | Bose et al. ................... | 29/889.1 |
| 2006/0045785 | A1 | 3/2006 | Cahoon | |
| 2006/0222776 | A1 | 10/2006 | Madhava et al. | |
| 2009/0297701 | A1 * | 12/2009 | Jabado et al. ................. | 427/142 |

FOREIGN PATENT DOCUMENTS

| DE | 1952370 A1 | 8/1970 |
|---|---|---|
| DE | 2600237 A1 | 7/1976 |
| EP | 1685923 A1 | 8/2006 |
| EP | 1707650 A1 | 10/2006 |
| EP | 1927672 A2 | 6/2008 |
| WO | WO 2005093128 A1 | 10/2005 |
| WO | WO 2007042395 A1 * | 4/2007 |

OTHER PUBLICATIONS

Hawley's Condensed Chemical Dictionary (15th Edition), 2007, John Wiley & Sons, Interactive Table-Chemical Properties of Material, item No. 203.*

* cited by examiner

*Primary Examiner* — Dah-Wei Yuan
*Assistant Examiner* — Nga Leung V Law

(57) ABSTRACT

A method for repairing a component such as a turbine blade is provided. At the end of its operating time, the component has, for example, a depletion of aluminium in a region near the surface. The application of a repair layer is provided including particles with an increased proportion of aluminium. A subsequent heat treatment may achieve the effect of equalizing the concentration of aluminium between the repair layer and the region near the surface, and so the aluminium content required for new components is achieved again.

9 Claims, 1 Drawing Sheet

METHOD FOR REPAIRING A COMPONENT BY COATING

CROSS REFERENCE TO RELATED APPLICATIONS

This application is the US National Stage of International Application No. PCT/EP2008/062510, filed Sep. 19, 2008 and claims the benefit thereof. The International Application claims the benefits of German application No. 10 2007 046 386.5 DE filed Sep. 21, 2007. All of the applications are incorporated by reference herein in their entirety.

FIELD OF INVENTION

The invention relates to a process for repairing a component, the region of which near the surface has damaged locations, in which process a coating material is applied to the component, in particular by cold spraying, in the form of particles, and the component is then heated.

BACKGROUND OF INVENTION

A process of this type is known, for example, from US 2006/0045785 A1. In this process, cold spraying is used to repair worn regions of a turbine blade by renewed application of material. For this purpose, the blade which comprises a titanium alloy has material comprising either the same titanium alloy or a related titanium alloy applied to it and, in the context of further processing, heat treatment is carried out and the final contour is produced, for example, by means of grinding. A similar process, in particular for repairing cracks in the surface of turbine blades, is described in US 2002/0066770 A1.

SUMMARY OF INVENTION

The object of the invention is to specify a process for repairing a component by means of cold spraying, by means of which process it is possible to restore the component properties of the component to be repaired to the greatest possible extent.

According to the invention, this object is achieved by the process mentioned in the introduction in that a component, which contains a damaged location of the region near the surface to the effect that at least a specific microstructural proportion falls below the required concentration, is repaired by the repair material having a concentration of this specific microstructural proportion which exceeds the required concentration. Therefore, the process is used in the case of components such as turbine blades which have reached the end of their service life and, in addition to visible wear phenomena such as abrasive wear or the formation of cracks, also have wear phenomena which are initially invisible, such as degradation of the microstructural regions near the surface. Specifically, during operation, the microstructural composition of components which are subjected to particularly high thermal loading, such as turbine blades, changes because specific microstructural proportions form oxides on the surface of the component in order to protect the latter. Constant degradation means that these oxides have to be recreated on the surface, for which reason the component continues to deliver material for oxidation in a diffusion-controlled manner. These processes mean that the microstructural proportion of this material decreases as the component continues to be used, until a limit value at which it is necessary to replace the component is reached.

This is where the invention becomes relevant; the component is conditioned better for reuse than in the prior art since, after the repair, not only does the applied material have the required material composition of the component, but also the coating material deliberately has a concentration of this specific microstructural proportion which is higher than necessary for the component. During the subsequent heating of the component, which results from a targeted heat treatment or else from using the component under thermal loading, the different concentrations of the specific microstructural proportion in the repair coating and also the underlying component are adjusted in a manner governed by diffusion, such that the entire component advantageously at least approximately has the required concentration of the specific microstructural proportion again. This makes it possible to restore the properties of the component such that it is approximately comparable to the new part, and so the repaired component is also expected to have a service life comparable to that of the new component.

One advantageous refinement of the invention provides for the specific microstructural proportion to be present in particles which are provided with a casing. This has the considerable advantage that it is also possible to process microstructural proportions which would be too sensitive to be applied by means of cold spraying (if this coating process is selected). In this context, it should be taken into consideration that the coating is accompanied by considerable mechanical loading and heating of the layer material, and therefore it is feared that sensitive layer materials would suffer premature degradation which reduces or prevents the subsequent effect of a balancing of the concentration of the specific microstructural proportion in the repaired component. Mention should be made, in particular, of metals which are at great risk from oxidation and, without the measure of a casing, could merely be processed in a protective gas atmosphere, and this would make the use of cold spraying much more expensive.

Although it is known from EP 1707650 A1 to provide layers of, for example, turbine blades with nanoparticles which form a deposit of specific alloy proportions of the layer, these particles are used throughout the layer of the new part in order to increase its service life. By contrast, the particles are used in the process according to the invention for repairing layers to the effect that the material thereof diffuses into "worn" layers during the heat treatment and restores the integrity thereof for further use of the coated component.

In the process according to the invention, it is possible to process similar particles or else mixtures of particles having different compositions. By mixing the particles, it is advantageously possible to set a broad spectrum of different compositions of the repair coating with a limited supply of different types of particles. In particular, it is possible to mix encased particles, the production of which is associated with a relatively large outlay, with non-encased particles, where the non-encased particles contain that layer material which can be processed by means of cold spraying without any problems.

One particular refinement of the process provides for the particles with the casing to exclusively contain microstructural proportions which undershoot the required concentration in the component to be repaired. These are the microstructural proportions in the component to be repaired which, since the concentration is undershot, have to be topped up by means of the above-described concentration balancing. If these microstructural proportions are provided in a high concentration in the encased particles, it is advantageously possible in a simple manner to continuously set the concentration of the specific microstructural proportion by admixing the encased particles to the particles which determine the composition of the layer to be applied. After analysis of the component to be repaired, it is possible to produce the most suitable particle mixture, taking into account the concentration balancing process. Encased nanoparticles, which are potentially suitable for the present invention, are specified in EP 1 707 650 A1, the encased nanoparticles in this document being used as material deposits which release the material only slowly since the casing remains intact.

By way of example, the specific microstructural proportions may be aluminum or aluminum and chromium as an alloy. These microstructural proportions are used in the case of turbine blades which have a so-called MCrAlY layer or are produced completely from said alloy. In this alloy, it is specifically just the microstructural proportions of chromium and aluminum of which the concentration decreases during operation of the turbine blade.

Metal oxides, in particular aluminum oxide, yttrium oxide, zirconium oxide or chromium oxide, are advantageously suitable as the casing. These oxides advantageously form very thermally stable casings around the particles to be processed. These casings can be destroyed by the particles striking against the component and by the associated mechanical loading as early as during the formation of the repair layer, such that no resistance is provided to diffusion-governed concentration balancing between the repair layer and the component.

However, the casing can also advantageously consist of a metal, in particular cobalt, nickel or chromium, or a metal alloy of these metals. These metals likewise afford sufficient protection during the processing of the particles since they are relatively stable, in particular, with respect to oxidation. A metal casing has the advantage that the materials of the casing, after the latter has been destroyed, can form an alloy proportion without it being necessary for oxygen to remain in the microstructure.

It is particularly advantageous if the particles which contain the specific microstructural proportion are nanoparticles. This has the advantage that the microstructure phase, which should be involved in the concentration balancing in a manner governed by diffusion, is distributed very finely in the repair layer and therefore the distances which the diffusing elements have to cover are smaller. In order to ensure processability by means of cold spraying, the nanoparticles have to be deposited, for example, on the surface of the other coating particles. This can be achieved, for example, by pretreating the powder to be processed by grinding. Another possibility is to agglomerate the nanoparticles such that these can be processed as agglomerates. The agglomerate structure then comes loose when it strikes against the component to be coated, as a result of which the fine distribution between the other coating particles is retained. It is also possible for the other particles, which do not contain the specific microstructural proportion, to be in the form of nanoparticles. In this case, these have to be agglomerated with the nanoparticles which contain the specific microstructural proportion, in which case particle mixtures arise in the agglomerates.

It is particularly advantageous if the component is heated to a temperature above the melting point of the specific microstructural proportions. This makes it possible to speed up the process of diffusion-controlled concentration balancing since a liquid phase of that microstructural proportion which should bring about the concentration balance is formed in the surrounding microstructure of the repair coating. This greatly speeds up the exchange of the liquid phase at the phase boundaries to the surrounding microstructure. In addition, the liquefaction of the microstructural proportion is associated with a large expansion which is received by the surrounding microstructure, in which case a casing of a metal oxide, in particular, is destroyed on account of the lower coefficient of thermal expansion, if this has not already taken place upon striking of the particles in question. This also advantageously makes it possible to speed up the concentration balancing process since the diffusion barrier of the casing or the remnants thereof are destroyed.

It is also advantageous if the component is heated to a temperature below the recrystallization temperature of the microstructure of the region near the surface of the component to be repaired. As a result, it can be achieved that the fundamental microstructure, in particular the grain size of the microstructure region near the surface, is not influenced. The increase in temperature merely speeds up diffusion processes which yield the desired concentration balance.

However, in the case of specific components, it may also be desirable to heat the component to a temperature above the recrystallization temperature in order, for example, to reduce stresses in the microstructure, in which case the concentration balancing process is advantageously also sped up as a result.

It should also be noted that, even if the concentration balancing is not completely finished by the heat treatment, progressive concentration balancing can take place when the component is returned to service, in the case of components subjected to high thermal loading, since the operating temperatures are sufficiently high for a diffusion process to take place (this has finally also resulted in a loss of the specific microstructural proportion during operation).

It is also advantageous if the component is heated to a temperature above the operating temperatures of the microstructure of the region near the surface. In this temperature range, it is always possible for the specific microstructural proportions to diffuse from the repair layer into the regions near the surface of the component. Above the operating temperatures, this process is advantageously sped up further, and this advantageously shortens the heat treatment times for subsequent treatment. The heat treatment can normally be carried out at a higher temperature level than is possible during the operation of the component, because this process acts only for a limited time on the component and can additionally be monitored more effectively, such that a safety margin to temperatures at which the integrity of the component microstructure is at risk can be chosen to be smaller than during the operation of said component.

BRIEF DESCRIPTION OF THE DRAWINGS

Further details of the invention are described below with reference to the drawing. Identical or corresponding elements in the drawing are provided in each case with the same reference symbols in the individual figures, and are explained in more detail only if there are differences between the individual figures.

DETAILED DESCRIPTION OF INVENTION

Figure 1:
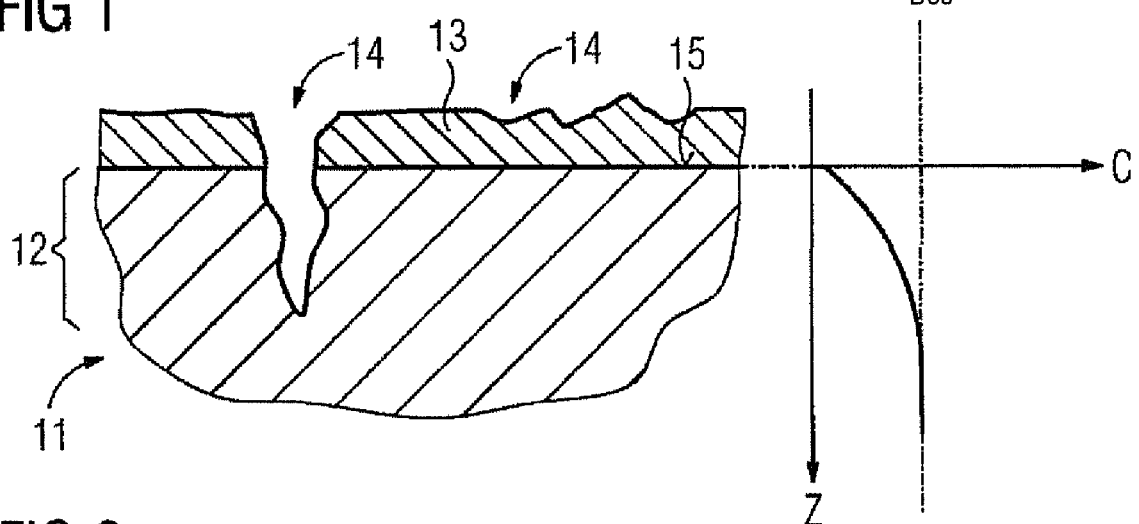
FIGS. 1 to 3 show different phases of a component which is treated according to an exemplary embodiment of the process according to the invention, where in each case only an excerpt of the component is shown as a section.

A component 11 as shown in FIG. 1 is a turbine blade formed by an MCrAlY alloy. The figure shows a region 12 near the surface of the turbine blade which has a coating 13. By way of example, this may consist of a thermal barrier coating (TBC), this layer serving to thermally protect the turbine blade. The region 12 near the surface of the component 11 can itself represent a layer on a base body (not shown in more detail), it also being possible to produce the blade in solid form from the MCrAlY alloy.

FIG. 1 also shows damaged locations 14 which may consist, for example, in abrasive wear on the surface or a crack. In addition, a graph which is true to scale with respect to the illustration of the component 11 plots the concentration of a specific microstructural proportion C against a path coordinate z which indicates the distance to the surface 15 of the uncoated component 11. By way of example, the specific microstructural proportion may be the aluminum content of the MCrAlY alloy.

A concentration $C_{des}$ of aluminum in the layer is shown in all the figures as a dash-dotted line. A new part has approximately this concentration before it is put into operation. However, the component 11 to be repaired, as shown in FIG. 1, has the concentration indicated, it being clear that the desired concentration $C_{des}$ is still reached in deeper regions of the component 11. In the region 12 near the surface, however, the concentration decreases, and is very low on the surface 15.

Figure 2:
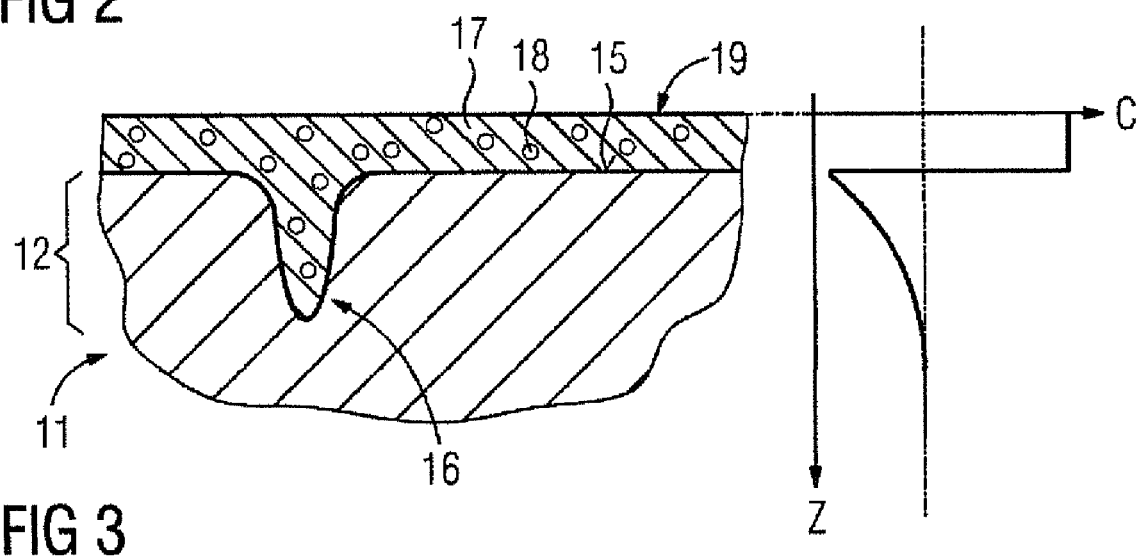

FIG. 2 shows a phase of the repair process which has been preceded by cleaning of the component 11, with material being removed from the coating 13. During this material removal, the walls of the crack 14 shown in FIG. 1 were also smoothed, such that a groove 16 was formed in the surface 15.

In a subsequent coating step, this has been completely filled with a coating material 17 for repairing the component 11. The coating material 17 contains encased nanoparticles 18, where the material of the nanoparticles consists of aluminum and aluminum oxide ($Al_2O_3$) was selected as the metal oxide. The parameters of the cold spraying are set such that the casing (not shown in more detail) of the nanoparticles was largely retained.

The concentration profile C, which is shown in FIG. 2 alongside the component 11, shows that nothing has changed in the region of the component 11 in terms of the concentration distribution, as compared with the initial state shown in FIG. 1. However, the concentration of aluminum in the repair layer 19 is considerably higher; here, it should be noted that in this case the average concentration of aluminum was calculated on the basis of the aluminum content both in the repair layer 19 and in the nanoparticles 18.

Figure 3:
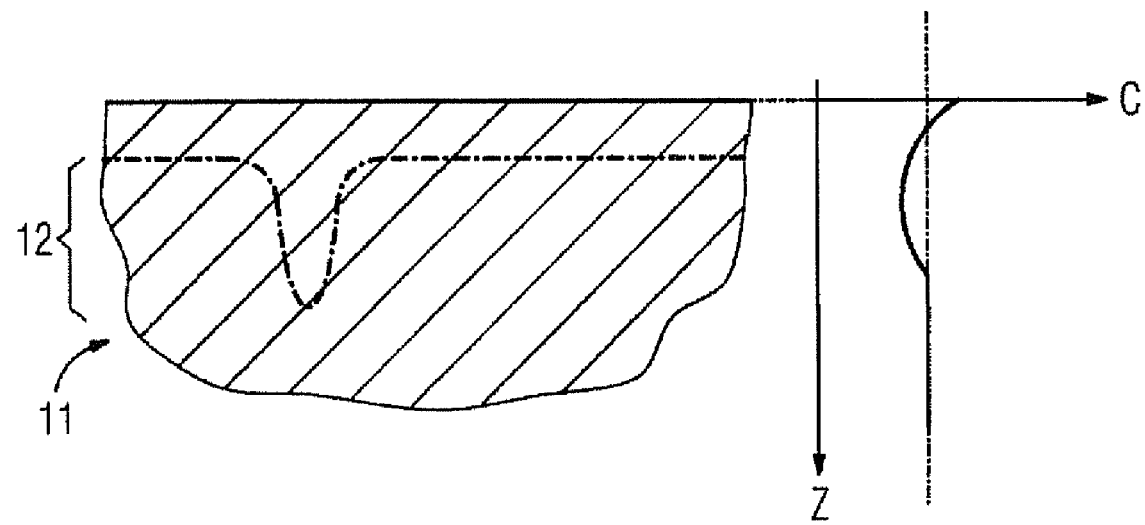

FIG. 3 shows the component 11 after the heat treatment has taken place. The heat treatment can take place at temperatures above the melting point of aluminum (about 660° C.). Owing to the dimensions of the nanoparticles, the melting point of the aluminum turns out to be even slightly lower, and this has an advantageous effect on the temperatures required for melting the nanoparticles. During the cold spraying, the particles were heated to at most 200° C., where temperatures of the carrier gas of up to 850° C. were possible during the cold spraying without greater heating of the particles being recorded.

At the temperatures which occur during the heat treatment, the casings of the nanoparticles break up and the aluminum concentration is balanced in the repaired component, as can be gathered from the accompanying graph. It can be seen that the concentration C of aluminum in the former repair layer, which is now merely indicated by a dash-dotted line in FIG. 3, has been reduced to a large extent and is set in a narrow range around the desired concentration $C_{des}$. At the same time, the concentration of aluminum in the region 12 near the surface of the component has increased in a diffusion-controlled manner, such that the desired concentration $C_{des}$ has almost been reached there. Therefore, the repaired component advantageously has a property profile which almost measures up to that of the new part. The component 11 can be finished by additionally providing it with a TBC (not shown).

The invention claimed is:

1. A process for repairing a component, a region of the component near the surface has damaged locations, comprising:
   applying a coating material to the component including the region in a form of a plurality of particles by cold spraying; and
   heating the component after the application of the coating,
   wherein the damaged location of the region near the surface contains a degradation of a microstructure whereby that at least a specific microstructural portion falls below a required concentration,
   wherein the coating material has a concentration of the specific microstructural portion which exceeds the required concentration, and
   wherein after the heating, the specific microstructural portion of the coating material diffuses into the component including the damaged locations with the result that the entire component includes the required concentration,
   wherein the specific microstructural portion is present in a first plurality of particles which are provided with a casing where the specific microstructural portion is aluminum or aluminum and chromium and the casing consists of a metal or a metal oxide,
   wherein the first plurality of particles is mixed with a second plurality of non-encased particles, and
   wherein the plurality of particles includes the mixture of the first plurality of particles and the second plurality of particles so that the mixture is applied to the coating and throughout the damaged locations,
   wherein the metal oxide is selected from the group consisting of: aluminum oxide, yttrium oxide, zirconium oxide and chromium oxide, and
   wherein the metal is selected from the group consisting of: cobalt, nickel or chromium, and a metal alloy of these metals.

2. The process as claimed in claim 1, wherein the first plurality of particles with the casing exclusively comprise a microstructural portion which undershoots the required concentration in the component to be repaired.

3. The process as claimed in claim 1, wherein at least the plurality of particles which comprise the specific microstructural portion are a plurality of nanoparticles.

4. The process as claimed in claim 1, wherein the component is heated to a temperature above a melting point of the specific microstructural portion.

5. The process as claimed in claim 1, wherein the component is heated to the temperature below a recrystallization temperature of the microstructure of the region near the surface.

6. The process as claimed in claim 1, wherein the component is heated to the temperature above an operating temperature of the microstructure of the region near the surface.

7. The process as claimed in claim 1, wherein the repaired component is a turbine component.

8. The process as claimed in claim 7, wherein the turbine component is a turbine blade.

9. The process as claimed in claim 7, wherein the turbine component is a compressor blade.

* * * * *